United States Patent [19]

Cooke et al.

[11] Patent Number: 5,134,222
[45] Date of Patent: Jul. 28, 1992

[54] POLY(BUTYLENE TEREPHTHALATE) COPOLYESTER AND A PROCESS FOR PREPARING IT

[75] Inventors: A. Wayne Cooke, Charlotte; Barrie L. Davies, Weddington, both of N.C.

[73] Assignee: Hoechst Celanese Corporation, Somerville, N.J.

[21] Appl. No.: 812,663

[22] Filed: Dec. 23, 1991

[51] Int. Cl.$^5$ .................... C08G 63/02; C08G 63/692
[52] U.S. Cl. .................................. 528/272; 528/274; 528/286; 528/302; 528/308; 528/308.6; 525/437; 525/444; 428/480
[58] Field of Search ............ 528/272, 274, 286, 302, 528/308, 308.6; 525/437, 444; 428/480

[56] References Cited

U.S. PATENT DOCUMENTS 4,328,059 5/1982 Horlbeck et al. .................... 156/332
4,559,370 12/1985 Blanpied .............................. 521/112

Primary Examiner—Samuel A. Acquah
Attorney, Agent, or Firm—Philip P. McCann

[57] ABSTRACT

Poly(butylene terephthalate) copolyester advantageous of use as sheath materials in bicomponent fibers are prepared by a process for preparing a high-molecular weight, linear copolyester by condensing 40-85 molar percent of terephthalic acid optionally in the form of a dialkyl ester, half of which component can optionally be replaced by another dicarboxylic acid also optionally in the dialkyl ester form, and 60-15 molar percent of a blend of dimethyl adipate, dimethyl glutarate and dimethyl succinate with an alkanediol of 2-6 carbon atoms in its carbon chain, at an elevated temperature in the presence of a conventional catalyst, in a first condensation stage which is an interesterification or esterification stage and a second condensation stage which is a polycondensation stage, whereby a copolyester melt is produce. The process comprises, before or during the first condensation stage, adding 0.005-0.1 molar percent, based on the total acid component, of a $C_6$-aryl or $C_7$-alkaryl ester of phosphorous acid or of phosphoric acid to the reaction mixture.

6 Claims, No Drawings

POLY(BUTYLENE TEREPHTHALATE) COPOLYESTER AND A PROCESS FOR PREPARING IT

BACKGROUND OF THE INVENTION

The present invention relates to a high-molecular weight, linear copolyesters and in particular, a poly(butylene terephthalate) (PBT) copolymer and a process for preparing it by the condensation of 40–85 molar percent of terephthalic acid or an ester thereof which component can be substituted to up to 50% by other dicarboxylic acids, and 60–15 molar percent of adipic acid with alkanediols having 2–6 carbon atoms in the carbon chain, in 2 stages at an elevated temperature in the presence of conventional catalysts.

Such copolyesters, as well as their manufacture, are known in principle and are disclosed in U.S. Pat. No. 4,328,059 which is incorporated by reference.

At high temperatures required for the polycondensation, especially in the second condensation stage (polycondensation stage), the presence of adipic acid results in final products which have a pinkish discoloration. This is unacceptable to the processor of these products. Therefore, the addition of esters and salts of phosphoric acids in conjunction with talc has been proposed (DOS No. 2,703,417). At a low adipic acid content of the copolyesters (<15 molar percent based on the total acid component), these measures partially improve the color of the finished products. At higher adipic acid contents, the undesirable discolorations cannot be avoided to an adequate extent.

Adipic-acid-containing copolyesters exhibit an additional grave deficiency. In the melt, they do not show adequate stability against degradation by thermal oxidation. Yet, such stability is absolutely required, for example, in hot-melt [fusion] adhesives, since the latter are kept in open melt tanks during their processing for a prolonged period of time.

SUMMARY OF THE INVENTION

Accordingly, it is an object of the present invention to provide a poly(butylene terephthalate) copolymer which does not exhibit the above-described disadvantages, as well as a process for preparing it and methods of using them, e.g., as sheath materials for bicomponent fibers.

Upon further study of the specification and appended claims, further objects and advantages of this invention will become apparent to those skilled in the art.

These objects have been attained by condensing 40–85 molar percent of terephthalic acid optionally in the form of a dialkyl ester, half of which component can optionally be replaced by another dicarboxylic acid also optionally in the dialkyl ester form, and 60–15 molar percent of a blended product of dimethyl adipate, dimethyl glutarate, and dimethyl succinate with at least one alkanediol of 2–6 carbon atoms in its carbon chain, at an elevated temperature in the presence of a conventional catalyst, in a first condensation stage which is an interesterification or esterification stage and a second condensation stage which is a polycondensation stage, whereby a copolyester melt is produced, which comprises, before or during the first condensation stage, adding 0.005–0.1 molar percent, based on the total acid component, of a $C_{6-10}$-aryl, or $C_{7-20}$-alkaryl ester of phosphorous acid or of phosphoric acid including polyphosphoric acid (PPA) to the reaction mixture.

DETAILED DISCUSSION

Suitable aryl moities for the phosphorous or phosphoric acid esters include $C_{6-10}$-aryl, e.g., phenyl, naphthyl etc. or $C_{7-20}$-alkaryl containing 1–2 alkyl groups, e.g, tertbutylphenyl, nonylphenyl, cresylphenyl, etc. Mono-, di- and tri-esters are suitable.

Suitable aryl esters of phosphorous acid or phosphoric acid include, for example, triphenyl, tri-tert-butylphenyl, trinonylphenyl, tricresyl phosphates and similar compounds and polymeric species thereof, as well as the corresponding phosphites. As mentioned, the object of this invention can also be attained if only partially esterified compounds are employed. Preferably, triphenyl phosphate is utilized. The aryl esters are preferably employed in amounts of 0.01–0.06 molar percent based on the total acid component.

The acid component of the copolyesters contains 40–85 molar percent, preferably 50–75 molar percent, of terephthalic acid and 15–60 molar percent, preferably 25–50 molar percent of adipic acid.

Up to 50 molar percent of the terephthalic acid can be replaced by other aromatic, cycloaliphatic and/or aliphatic dicarboxylic acids, such as phthalic acid, isophthalic acid; tetra-(hexa-)hydrophthalic acid, -isophthalic acid, -terephthalic acid; oxalic acid, malonic acid, succinic acid, glutaric acid, sebacic acid, 1,10-decanedicarboxylic acid, and others.

All aforementioned acids can be utilized in the form of their $C_1$-$C_4$-alkyl ester derivatives.

Suitable diols include alkanediols of 2–6 carbon atoms in the carbon chain. Examples include ethylene glycol, propylene glycol, butylene glycol etc. Ethylene glycol and butylene glycol are preferred. The alkanediols can also be used in admixture.

The polyester preparative process is basically conventional and unless specified otherwise herein, all details of the process of this invention are in accordance with these prior art procedures, e.g., as disclosed in Sorensen and Campbell— Preparative Methods of Polymer Chemistry, Interscience Publishers, Inc., New York [1961]: 111–127; Kunststoff-Handbuch [Plastics Manual] 8 [Polyesters], Carl Hanser publishers, Munich [1973]: 697, where disclosures are incorporated by reference herein. Thus, the starting compounds can be, for example, the dimethyl esters of the acids, and the diols, and an interesterification is first carried out, after the addition of a suitable conventional catalyst. When dicarboxylic acids per se are employed, the esterification can take place at the same time or after the interesterification. This process stage is referred to as the first condensation stage hereinabove. Subsequently, the polycondensation, (i.e., the second condensation stage) is executed under vacuum or in a nitrogen stream with further heating.

The polyester prepared by the process of this invention have an intrinsic viscosity of 0.5–1.2 dl/g in orthochlorophenol solvent and 8 grams of polymer was mixed in 100 ml solvent.

The copolyesters prepared and used according to this invention exhibit a superior thermal-oxidation stability while retaining good general properties. They do not exhibit any color tinge.

The PBT copolyesters as described above are beneficially employed in the making of synthetic fibers and/or the encapsulation of other fibers. Such copolyesters can be extruded as a thin sheath on a core fiber of some other polymer such as poly(ethylene terephthalate) polyamide, polypropylene, and the like. Of special preference in this disclosure is the spinning of bicomponent fibers which have a core of PET or PBT covered with a sheath of the PBT copolyester of the present invention. Bicomponent fibers have been made in accordance with the methodology disclosed in U.S. Pat. application No. 07/454,217 filed Dec. 21, 1989.

In producing the bicomponent fibers having PET as the core around which the PBT copolymer is extruded as a sheath, one should bear in mind that typical commercial PET melts at about 250° C. unless modified with an ingredient which lowers the softening point. The melting point of highly crystalline PET is about 270° C. The softening/melting point of PBT usually depends on its degree of crystallization and can rang from a pressure deflection temperature at about 162° C. to above about 225° C. thus, the core of the fiber will solidify at a higher temperature than the grafted linear polymer or a blend which contains the linear polymer.

By having a sheath of the bondable PBT copolymer, the polyester fibers can be more efficiently used in nonwovens and the like where enhanced bonding of fibers is beneficial or otherwise desirable.

Another advantage of using the PBT copolymer as a component or constituent in a fiber arrangement is found in its batch dyeability. By having dyeable fibers, it becomes possible in many instances to avoid having to add color pigments to the polymers prior to fabricating the polymer into fibers or other end products.

The following data illustrate certain embodiments of the presently claimed invention, but the invention is not limited to the particular embodiments illustrated.

EXAMPLES

Comparative Experiment 1 of the prior art was prepared in accordance with the amounts shown in the Table as well as Experiment 2 which exemplifies the present invention.

In each experiment, the raw materials were charged into a reactor under nitrogen purge and the temperature was set at 220° C. The reaction mixtures were agitated and ester interchange started. The reaction monomer was polymerized after vacuum let down was completed.

Included in the raw materials is DBE-3, a blended product commercially available from duPont containing about 89% dimethyl adipate, 10% dimethyl glutanate and about 1% dimethyl succinate. TBT is tetrabutyl titanate. TPPO is triphenyl phosphate. IV is intrinsic viscosity measured in the solvent orthochlorophenol at 8 gm of polymer in 100 ml of solvent at 25° C. The color test was done in accordance with ASTM Method E308-85.

TABLE

|  | Comparative Experiment 1 | Experiment 2 |
|---|---|---|
| DMT, Kg | 8.0 | 8.0 |
| DBE-3 Kg | 2.4 | 2.4 |
| Butanediol, Kg | 5.8 | 5.8 |
| Hexanediol, g | 849 | 849 |
| TBT, g | 4.7 | 9.4 |
| TPPO, g | — | 2.64 |

TABLE-continued

|  | Comparative Experiment 1 | Experiment 2 |
|---|---|---|
| IV, dl/g | 1.06 | 0.88 |
| MP of polymer °C. | 168 | 169 |
| Color |  |  |
| L* (brightness) | 90.15 | 92.47 |
| A* (red/green) | 3.35 | 0.42 |
| B* (blue/yellow) | 11.95 | 4.05 |

Resulting polymer from the Comparative Experiment 1 was pink. Resulting polymer from Experiment 2 had acceptable color. In particular A* and B* were both significantly lower than the Comparative Experiment 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

What is claimed is:

1. A process for preparing a copolyester by condensing 40–85 molar percent of terephthalic acid optionally in the form of a dialkyl ester, half of which component can optionally be replaced by another dicarboxylic acid also optionally in the dialkyl ester form, and 60–15 molar percent of a blended product of dimethyl adipate, dimethyl glutarate and dimethyl succinate with an alkanediol of 2–6 carbon atoms in its carbon chain, at an elevated temperature in the presence of a conventional catalyst, in a first condensations stage which is an interesterification or esterification stage and a second condensation stage which is a polycondensation stage, whereby a copolyester melt is produced, which comprises, before or during the first condensation stage, adding 0.005–0.1 molar percent, based on the total acid component, of a $C_{6-10}$-aryl or $C_{7-20}$-alkaryl ester of phosphorous acid or of phosphoric acid including polyphosphoric acid to the reaction mixture.

2. A process of claim 1, wherein before or during the first condensation stage, 0.01–0.06 molar percent of the aryl or alkaryl ester is added.

3. A process of claim 1 wherein the aryl or alkaryl ester is triphenyl, tri-tertbutylphenyl, trinonylphenyl or tricresylphosphates or phosphites.

4. A process of claim 1 wherein triphenyl phosphate is the aryl ester.

5. A high molecular weight copolyester prepared by the process of claim 1.

6. A process for preparing a poly(butylene terephthalate) (PBT) copolymer by condensing 40–85 molar percent of dimethyl terephthalate (DMT); and 60–15 molar percent of a blended product of dimethyl adipate, dimethyl glutarate and dimethyl succinate; with butanediol and hexanediol, at an elevated temperature in the presence of a conventional catalyst, in a first condensation stage which is an ester interchange stage and a second condensation stage which is a polycondensation stage, whereby the PBT copolymer is produced, which comprises before or during the ester interchange stage adding 0.005–0.1 molar percent triphenyl phosphate based on DMT.

* * * * *